United States Patent [19]

Loggers et al.

[11] 4,419,312

[45] Dec. 6, 1983

[54] METHOD FOR MAKING GRANULAR HYDROTHERMALLY HARDENED MATERIAL

[75] Inventors: Hendrik Loggers, Amerongen; Gijsbert Versteeg, Nunspeet, both of Netherlands

[73] Assignee: Aarding Weerstandslas B.V., Nunspeet, Netherlands

[21] Appl. No.: 564

[22] Filed: Jan. 2, 1979

[30] Foreign Application Priority Data

Dec. 30, 1977 [NL] Netherlands .......................... 7714619

[51] Int. Cl.³ .......................... B28B 1/00; B29C 25/00
[52] U.S. Cl. ...................................... 264/82; 264/117; 264/333; 264/DIG. 43
[58] Field of Search ................. 264/333, 82, DIG. 45, 264/234, 345, 117, DIG. 43

[56] References Cited

U.S. PATENT DOCUMENTS

| | | | |
|---|---|---|---|
| 2,602,754 | 7/1952 | Abraham | 264/82 |
| 3,238,279 | 3/1966 | Tarlton et al. | 264/82 |
| 3,250,836 | 5/1966 | Ulfstedt | 264/82 |
| 3,492,385 | 1/1970 | Simunic | 264/82 |
| 3,505,439 | 4/1970 | Moorehead et al. | 264/82 |
| 3,634,567 | 1/1972 | Yang | 264/DIG. 43 |
| 3,642,969 | 2/1972 | Estrada | 264/82 |
| 3,957,937 | 5/1976 | Lovell | 264/82 |

FOREIGN PATENT DOCUMENTS

| | | | |
|---|---|---|---|
| 684503 | 4/1964 | Canada | 264/82 |
| 53-197809 | 9/1978 | Japan | 264/DIG. 43 |
| 498483 | 1/1939 | United Kingdom | 264/82 |

OTHER PUBLICATIONS

Hodgman, Handbook of Chemistry and Physics, Chem. Rubber 31st. Ed., pp. 416, 417, 510, 511.

Primary Examiner—Willard E. Hoag
Attorney, Agent, or Firm—Burton, Parker & Schramm

[57] ABSTRACT

Hydrothermally cured articles are formed by mixing a filler and a binder, moulding this mixture and coating said moulded articles with silica or calcium hydroxide particles. Hydrothermal curing may comprise a first step, wherein the steam pressure in the autoclave is increased, thereafter the steam pressure is decreased and subsequently the pressure is increased to a steam pressure being higher than in the first step.

11 Claims, 8 Drawing Figures

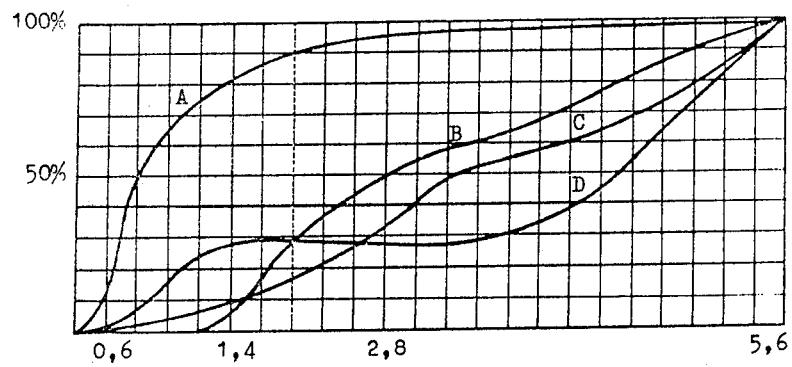
Fig: 1.
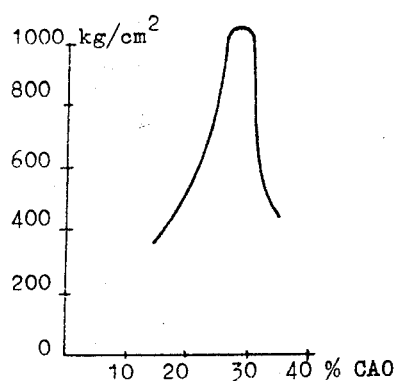
Fig: 2a.
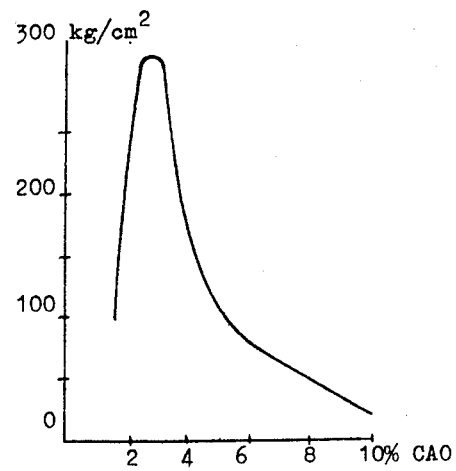
Fig: 2b.
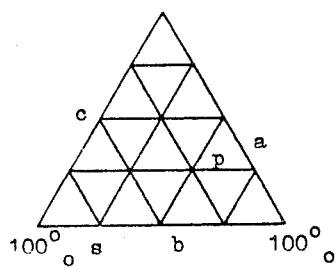
Fig: 2.
0-1 m.m.    1-3 m.m.

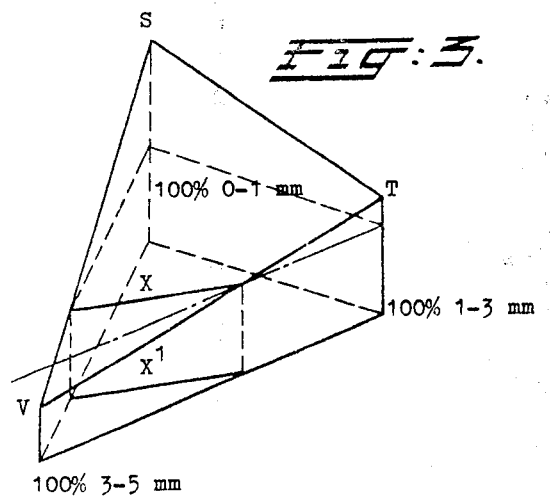
FIG. 3.
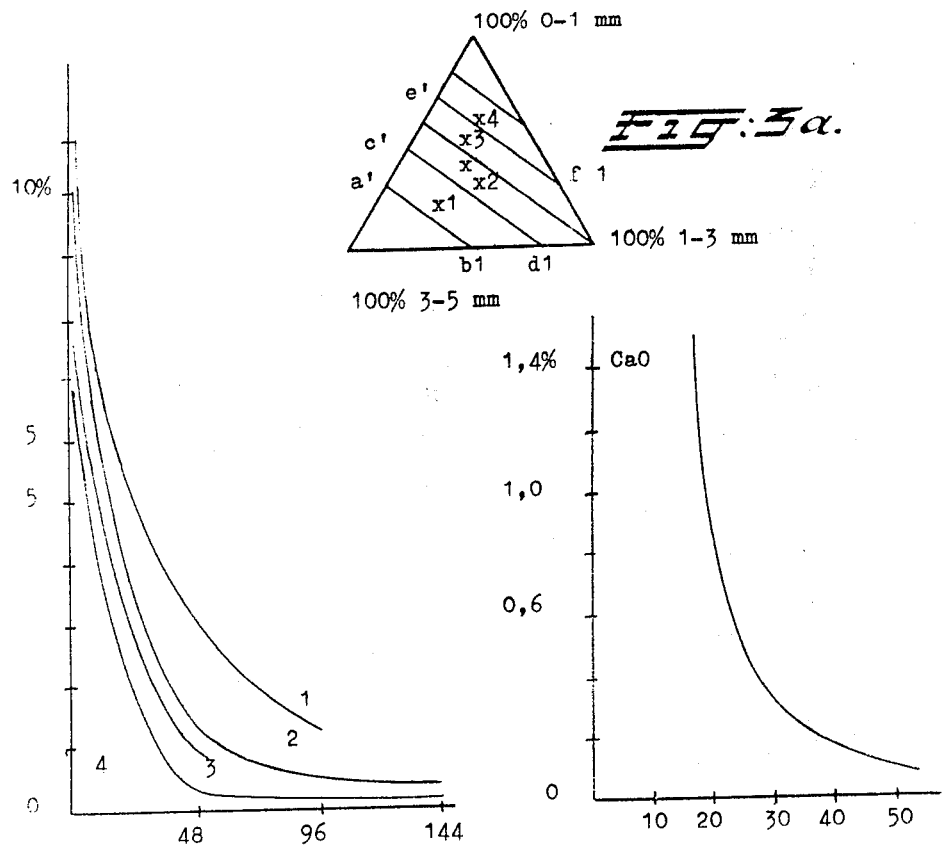
FIG. 3a.
FIG. 4a.
FIG. 4b.

4,419,312

METHOD FOR MAKING GRANULAR HYDROTHERMALLY HARDENED MATERIAL

BACKGROUND OF THE INVENTION

The invention relates to a method of producing hydrothermally hardened products, by a reaction of a calcium-oxide product and a silica containing product, in the presence of at least one filler, by heating the material under steam pressure in an autoclave.

It is known per se that calcium oxide and/or silica containing products may undergo a chemical reaction as a result of a hydrothermal treatment, thus imparting mechanical strength to a product.

This mechanical strength may vary up to a compression strength of hundreds of kg/cm$^2$, while the weight by volume of the products may vary.

The strength-imparting binding agent is produced from calcium oxide and silica containing materials during the time the mixture remains in an autoclave wherein a hydrothermal hardening process takes place. Sand may be used as silica containing material while calcium hydroxide is suitable as calcium oxide containing material.

The chemical reactions between the two materials proceed at the surface of the silica containing component, so that an indication of the specific surface as per BLAINE's determination supplies useful information when evaluating a sand or other silica containing material.

As is known, the composition of sand can be determined by a sieving-out process. Differences in the kinds of sand are, for instance, apparent from FIG. 1.

The width of the sieve opening or sand fraction is indicated horizontally, whereas the percentage of sand weight over a sieve opening of a certain diameter is indicated vertically.

Thus, according to the figure, 50% of the sand sample A is over the sieve opening having a diameter of 0.6 mm.

Line B represents a second, C a third, and D a fourth analysis.

On the other hand, triangle diagrams make is possible to show mixtures of three components, see FIG. 2. The components to be mixed are mentioned at the angles of the triangle, i.e. 100% 0–1 mm, 100% 1–3 mm, and 100% 3–5 mm. On the sides of the triangle, compositions may be indicated which are obtained by mixing for example the components 0–1 mm with the sand 1–3 mm.

Such a mixture may be indicated by a point S.

The size of the three fractions to be mixed in order to obtain P is to be determined in the following manner.

Three lines are drawn through point P which each run parallel to a side of the triangle.

These lines divide the sides of the triangle up into three segments.

The length of these line segments are then determinative of the composition of P.

Thus, P can be seen to be composed of:
25% fraction 3–5 mm
25% fraction 0–1 mm
50% fraction 1–3 mm The size of the fraction 0–1 mm is read on the opposite side, i.e. on that portion of the side which is bounded by the points of intersection with the two lines through P.

This is line segment a.

The size of the fraction 3–5 mm is found in the same manner and is represented by line segment b.

Line segment c finally indicates the size of the fraction 1–3 mm in the mixture.

When considering the triangle to be the base of a prism, it is possible to indicate in this prism points which represent certain measured quantities of mixtures from the triangle.

For instance, a sand composition obtained by mixing has a certain specific surface. The size of this surface may then be represented by a point that lies within the space diagram.

FIG. 3 shows such a space diagram.

The base is a triangle at whose angles there are located again the fractions 0–1; 1–3 and 3–5 mm.

Perpendicular to this triangle there are erected at its angles the lines S-T and V, the final points providing for a plane STV, which in the drawing means interconnecting S, T and V by lines.

The length of the respective perpendicular lines, chosen in this case to be different, may be assigned for instance the value for the specific surface.

When the fractions are mixed, the mixtures will have specific surfaces lying between that of V and that of S.

The values for these specific surfaces can be found in the plane through S, V and T.

As it turns out, different mixtures are possible which have an identical specific surface.

These mixtures are found by imagining, at a given distance from the base, a plane that intersects the plane S.T.V.

In this imaginary plane, all points to the base, the triangle, are located at the same distance.

The line X intersecting with the plane S.T.V. lies within this imaginary plane.

It follows that the points of the line X are equidistant from the base and so have an identical specific surface. The mixtures comprised by this particular surface can be found by dropping perpendicular lines from the line X onto the triangle.

The line X is then found in the mixing triangle.

When moving the plane parallel to the base upwards, lines of intersection with the plane S.T.V. are obtained which all run parallel to X.

Since the distance from the base increases, however, the specific surfaces increase as well.

The graphical representation 3a shows once again the triangle diagram wherein there are shown the projections of the intersecting lines of the two planes in the case of the plane which runs parallel to the base being moved upwards.

These projections likewise run parallel to X.

The specific surface increases from X to X4.

The binding is brought about by calcium oxide and silica during the hardening phase.

The silica is available in limited quantities in the sand grain skin for the preparation of the agent.

The specific surface of a sand is, therefore, an indication of the amount of binding agent that can be formed.

If a particular sand should have a specific surface which is too small to enable conversion of all the lime during the hardening phase, it is useful to prolong the hardening time.

After such an extension of time, the compression strength will be found to have increased. This results from the fact that during the extended time of hardening the lime slowly penetrates through the reaction skin formed about the sand grain, and so is able to react with the silica. If, conversely, a particular sand has a large specific surface, the lime being present in small quantity, then the point at which the maximum amount of binding agent to be expected will have been prepared, will be reached more rapidly.

Therefore, a second important piece of information is the amount of active calcium oxide contained in a calcium oxide containing product used. The quantity of active calcium oxide is determined in the Netherlands as well as in other countries by means of the so-called "sugar method".

When mixing three components, such as ground phosphate rock with sand and a second kind of sand, it is possible to prepare a product with two kinds of sand (these materials to be indicated at the axes of FIGS. 1–4(b) so as to direct one's thoughts).

After all, the ground phosphate rock also contains sand that has a specific surface or that has a certain need for calcium oxide.

This need for lime, or rather the reactive surface with respect to the calcium oxide containing component may be determined by ascertaining the sugar-soluble calcium oxide content, after a hydrothermal treatment, which occurs in mixtures that were made with different percentages of calcium oxide.

It is apparent from FIGS. 2a and 2b that to build up the strength of the products formed it is necessary to be skilled in the art. FIG. 2a shows the strength of compressed mixtures of ground sand rich in quartz having a BLAINE fineness of about 850 cm$^2$/gram and a calcium hydroxide as a function of the total calcium oxide content. The maximum value of the strength is rather critical, that is, in order to obtain the maximum strength it is essential to properly choose the ratio between the amount of calcium oxide to be used and the amount of silica that can react with the calcium oxide.

Such a precisely adjusted mixture ratio is also apparent from FIG. 2b.

In this graphical representation the shape of the strength curve for mixtures of coarse gravel, sand, ground sand and hydrated lime is shown as a function of the total CaO content.

The specimens so obtained were produced by mixing much water with the mixtures and by subsequently pouring them into a mould which was left in position around the specimen during the hardening phase.

The graphs show furthermore the extent to which the strength values of the products formed differ.

SUMMARY OF THE INVENTION

It has now been found that when applying a method for producing hydrothermally hardened products by reaction of a calcium-oxide product and silica containing product, with or without at least one filler being present, by heating under steam pressure in an autoclave, it is possible to prevent the formation of cracks in hydrothermally hardened products, as a result of which the mechanical properties are improved and freely flowing particles are obtained according to the invention, by increasing in a first stage the steam pressure in an autoclave, by thereupon decreasing in a second stage the pressure in the autoclave and by subsequently increasing in a third stage the steam pressure up to a pressure which is higher than the pressure in the first stage.

In the first stage the pressure is mostly increased up to 0.8 to 0.9 atm., in the third stage up to more than 1 atm., preferably a hardening pressure which for example may vary from 8 to 24 atm.

In the second stage the pressure in the autoclave is allowed to drop to a pressure between 0.1 and 0.5 atm., preferably about 0.2 atm., which decrease in pressure is brought about preferably by terminating the steam supply.

It has been found that in this manner it is possible to obtain hydrothermally hardened products of considerable strength which can be used as concrete aggregates, the concrete thus obtained having normal properties of strength on the one hand and a lower weight by volume on the other hand.

The invention further relates to a method of producing hydrothermally hardened products wherein at least one filler is mixed with a binding agent, the mixture for said products is formed, these products are covered with silica containing particles and/or calcium oxide containing particles, whilst subsequently such products are hardened under steam.

Thus, it is possible to obtain products which in their core contain a filler, for instance in the form of a waste product which in this way can be processed usefully, and is suitable as a concrete aggregate.

According to a very preferred form of this method, it is thus possible to work chemically reactive reaction components effectively up into products having certain dimensions, thus rendering it possible to maintain optimum conditions during for instance the recovery of raw materials from such products. An example is for instance phosphate rock, but other materials may be considered as well.

When forming hydrothermally hardened products consisting of a core of a filler which is whether or not chemically reactive, surrounded with an incasing layer of a hydrothermally hardened product, it is advisable to carry out the hardening of the incasement by first increasing the steam pressure in an autoclave, by subsequently allowing in a second stage the pressure in the autoclave to drop and by thereupon increasing the steam pressure up to a pressure which is higher than the pressure in the first stage.

A particularly preferred form of the method of the invention is in that phosphate rock is worked up into hydrothermally hardened products composed of a core of phosphate rock surrounded by an incasement of a hydrothermally hardened product consisting of silica containing and calcium oxide containing particles.

It is possible to work effectively with a silicacontaining product having a Blaine fineness of 800 to 4500, preferably approximately 880, but even more effectively with a product having two finenesses, i.e. one fineness of 800 to 900 and one fineness of 350 to 450 Blaine.

The methods of the invention lend themselves also in particular to the production of concrete aggregate materials (ballast in concrete) which, in addition to calcium oxide containing and silica containing products, contain ground or unground carbon particles.

The invention also relates to shaped products obtained by applying the methods according to the invention.

As appears from Dutch patent application 66.08852, granulated phosphate rock, or formed particles containing phosphate rock, is of great importance to the recovery of elementary phosphorus from phosphate rock by reduction with carbon in the presence of silica.

With this method the reaction proceeds in accordance with the following equation:

$$Ca_3(PO_4)_2 + 5C + 3SiO_2 \rightarrow 3CaOSiO_2 + P_2 + 5CO.$$

Besides the necessary phosphate rock in granulated form it is also necessary to use the silica needed for the reaction, in measured sizes.

Products obtained in accordance with the invention may contain both phosphate rock and silica, and may have dimensions and strengths which are necessary so as to properly carry out the method.

Surprisingly, it has turned out that the quantity of carbon needed for such a method can also be included in the products obtained in accordance with the invention.

Tests have actually shown that it has been possible to make grains from (1) sand, ground sand and calcium hydroxide;
(2) sand, ground sand and phosphate;
(3) sand, ground sand, phosphate and finely distributed carbon containing material, such as for example powdered coke.

It has been shown experimentally that also other components can be included in the products.

The strength of the grains is such that products of sand, ground sand and calcium hydroxide may be used as ballast in concrete as a substitute for gravel.

The concrete thus obtained possesses a sufficiently high compression strength but differs from the normal gravel containing concrete in that it has a lower weight by volume.

In order to produce such concrete ballast materials ground quartz sand is mixed with quartz sand, for instance at the ratio of 30:70. Subsequently, a certain quantity of slaked lime having an active calcium oxide content of 8.5% based upon the total mixture, is added to said mixture. After mixing the calcium oxide- and silica containing components, water is added to the mixture, and the vessel containing the mixture is rotated, thus producing grains. These grains are hydrothermally hardened in an autoclave. After hardening the grains have an enormous strength which makes them suitable as ballast material for concrete.

Materials other than quartz sand can be used in granulated form for the production of concrete aggregate materials as well.

It is also possible to include in the hydrothermally cured products several other materials such as clay, sand, soot, carbon, inorganic pigments, divided metals and alloys, certain synthetic materials, ores, phosphate rock, limestone, molten products, and the like. It is furthermore possible, according to the invention, to utilize as ballast in concrete materials having a small diameter, for instance clay, fine sand and other less costly materials. For such use, the granulated material can only consist of the components lime and sand or lime and clay or combinations of these two mixtures. The particle size can be adapted so as to meet the concrete-technological requirements. Also, it is possible to influence the properties of the concrete by changing the mechanical strength and weight by volume.

Thanks to their favorable mechanical properties, the products according to the invention are also adapted to contain i.a. chemical reaction components which are to partake in a chemical process. These chemical reaction components may then occur in defined quantities favorable to the chemical process. Since the product of the invention is obtained artificially, it is also possible to adapt the dimensions of the product so as to comply with particular wishes.

When performing tests with phosphate rock, it even proved possible to include the phosphate rock in the unground condition.

As the granulating quality of mixtures depends upon the amount of fine material and the amount of adhesive present among said fine material and which can only be water, the quantity of ground sand may be dispensed with in compositions wherein sufficient fine material is present.

Ground sand is added effectively if the mixture to be cured is brought around the granulated material after, while adding liquid, finely powdered reaction components or raw materials have been granulated. Thus, products are obtained which have a case or shell whose thickness it is easy to vary. This shell proves strong enough to be able to handle the products. The graph 2a shows how to choose the strength of the material of such a shell.

This shell may, of course, also contain sand as the silica containing reaction component for the calcium oxide containing reaction component. The calcium oxide containing component may consist of Portland cement or mixtures of Portland cement with calcium hydroxide or mixtures which besides calcium oxide containing materials contain ground blast-furnace slags.

After having made a particular choice, for example for the electrochemical recovery of elementary phosphorus, it is further possible to calculate the amount of free silica containing material needed for the reaction. Taking this quantity into account, correct compositions are arrived at by means of the diagrams provided in FIGS. 1 and 2.

It will be clear that the products for this mode of recovery of phosphorus may also contain carbon, phosphate rock or silica only, and the strength-imparting agent may be used fully mixed with the reaction component, partially mixed and partially as the shell or entirely as the shell.

Although it is of interest to the preparation of elementary phosphorus, there also seems to be, according to article 780 of FERTILIZER ABSTRACTS 7 (no. 5) of May 1974, an increased interest again for the recovery of $P_2O_5$ by means of a blast-furnace process that was in vogue around 1929 to 1939 in the United States of America. Granulated materials are required for this purpose as well.

In order to improve the insight into the surface reactions between calcium dioxide and the silica containing component, a guideline for several grades of sand will be given hereinafter. In the table below the grade is shown next to the active calcium oxide content, determined according to the "sugar method", expressed in percentages of the grade weight. After grade 2.8 mm the sieve meshes are square.

| Grade | % active CaO calculated as per grade weight |
|---|---|
| 5.6–2.8 mm | 1.56 |
| 1.4–2.8 mm | 1.79 |
| 0.6–1.4 mm | 4.08 |
| 0.3–0.6 mm | 6.07 |
| 0.150–0.3 mm | 7.46 |
| 0.090–0.150 mm | 11.52 |
| 0.075–0.090 mm | 22.97 |
| 0.060–0.075 mm | 23.65 |
| 0.050–0.060 mm | 41.21 |

-continued

| Grade | % active CaO calculated as per grade weight |
|---|---|
| <0.050– mm ca. | 68.00 |

(1) accuracy of the analysis figure ± 0.2%
(2) the figures relate to a material containing 92-99.8% $SiO_2$.

Should the silica containing component contain a different quantity of silica, then different percentages will apply.

The graphs 4a and 4b show the decrease in the sugar-soluble percentage of calcium oxide in mixtures of calcium oxide and silica containing materials as a function of the quantity atm. hrs.

This quantity is obtained as the product of the number of hours during which a product of the invention was in a hydrothermal atmosphere and the number of atmospheres under which this product was cured; this means, hardening during 8 hours at 8 atm. of steam pressure in an autoclave renders as the product the value for said quantity 64 atm. hrs.

In order to obtain the data used for the FIGS. 4a and 4b, a glass sand and a ground sand were worked with. The sieve specifics are as follows.

| | % through sieve | |
|---|---|---|
| Grade | sand | ground sand |
| 0.315–0.400 mm | 1 | |
| 0.200–0.315 mm | 42 | |
| 0.160–0.200 mm | 77 | |
| 0.100–0.160 mm | 98 | 1 |
| 0.063–0.100 mm | 100 | 15 |
| 0.050–0.063 mm | — | 21 |
| 0.040–0.050 mm | — | 32 |
| <0.040 mm | — | 68 |

For the preparation of the various mixtures the following compositions were weighed and put in. The slaked lime used contained, besides 93.5% total of calcium oxide, 91.5% sugar-soluble calcium oxide.

| No. | % sand | % ground sand | % lime |
|---|---|---|---|
| 1 | 89.5 | — | 10.5 |
| 2 | 61 | 26 | 13 |
| 3 | 92.3 | — | 7.7 |
| 4 | 67.36 | 24.5 | 8.14 |
| 5 | 64.56 | 27.76 | 7.68 |

When calculating the need for calcium oxide of the various mixtures on the basis of the figures given above, some mixtures in the graphs 4a and 4b turn out to be super-saturated with calcium oxide and some are unsaturated.

If the ratio of added quantity of calcium oxide/quantity of calcium oxide needed reaches the value 1, then there is a good mixture. If the value is greater than 1, then the mixture is said to be overdosed, whereas at a value smaller than 1 the mixture is underdosed.

| No. | Ration $\frac{\text{CaO added}}{\text{CaO needed}}$ |
|---|---|
| 1 | 1.49 |
| 2 | 0.969 |
| 3 | 1.03 |
| 4 | 0.623 |
| 5 | 0.566 |

At the value 1, the correct amount of calcium oxide would have been measured out against the specific surface, which could follow from a space diagram as per FIG. 1.

Hardening at 64 atm. hrs. has been taken as the basic value for calculating the need for calcium oxide of the sand grade as well as that for the sands mentioned above. The course of the proceeding of the considerably underdosed test No. 5, FIG. 4b, shows that a small quantity of sugar-soluble calcium oxide always remains demonstrable.

The calcium oxide containing component as used in the products of the invention may also be cement.

However, in order to obtain the strength desired more cement than calcium hydroxide is needed.

The table below provides some figures of hardened mixtures consisting of white cement and ground quartz sand. The figures were determined by means of compressed cubes and may be compared with the data as per FIG. 2a, as the prevailing conditions were identical.

| % white cement | % ground sand Blaine 85 $cm^2/g$ | compression strength $kg/cm^2$ |
|---|---|---|
| 10 | 90 | 118 |
| 20 | 80 | 253 |
| 30 | 70 | 338 |
| 40 | 60 | 472 |
| 50 | 50 | 790 |
| 60 | 40 | 710 |
| 70 | 30 | 962 |
| 100 | 0 | 1.000 |

It is also possible to obtain a binding agent from grey Portland cement, while hydrothermally hardened mixtures, consisting of combinations of calcium-hydroxide cement and silica containing materials, are known from the patent literature concerning the production of aerated concrete.

Objects obtained from the sand described above and the ground sand and grey cement have the following strength.

| Weight in % of the total composition | | | |
|---|---|---|---|
| sand | ground sand | grey Portland cement | strength in $kg/cm^2$ |
| 84.9 | — | 15.1 | 184 |
| 78 | — | 22 | 433 |
| 66.93 | 7.97 | 25 | 576 |

It is possible to include various materials in the products according to the invention. The products of the invention may contain the materials to be agglomerated in various ways. They can be mixed with the materials to be granulated or they can be put in a shell-like manner around the materials already granulated. Combinations of both are also possible.

Besides granulating under the influence of moisture in the presence of sufficient fine material and under the influence of a mechanical movement, products can also be formed by pouring mixtures rich in water into moulds. These products also prove to have sufficient strength enabling them to contain other materials. Both methods result in high production speeds.

A disadvantage of pouring is that after curing the products are to be reduced to the correct grain size by a crusher-sieving installation so as to make them suitable for further handling or treatment.

DESCRIPTION OF PREFERRED EMBODIMENT

EXAMPLE I 4300 g of ground phosphate rock with particles smaller than 0.150 mm and the composition: CaO 51.2%, $P_2O_5$ 33.3%, $Fe_2O_3$ 0.2%, $Al_2O_3$ 0.4%, F 3.2%, $SO_3$ 3.6%, $SiO_2$ 1.6%, $CO_2$ 2.4%, moisture 0.6%, is mixed with 2463 g of silica containing material (fineness according to Blaine 890 cm$^2$/gram), and 867 g of calcium hydroxide that contains approx. 69% active and approx. 72.4% total CaO. The mass is granulated while adding water. After granulating, the grains are subjected to a hydrothermal treatment in an autoclave. In this hydrothermal hardening phase the steam pressure in the autoclave is increased up to a pressure of 0.8 atm., whereupon the steam supply to the autoclave is terminated, causing the pressure in the autoclave to drop. After reaching a specified lower pressure of 0.2 atm., the steam supply to the autoclave is resumed, thus allowing the pressure to rise up to the maximum hardening pressure desired which is always higher than the pressure in the first hardening phase. Suitable hardening pressures are more than 1 atm., for example 8–26 atm. After the hardening process in the autoclave, the agglomerates have acquired a mechanical strength which is such that they can fall down several meters without breaking.

EXAMPLE II

An unground phosphate rock having the chemical composition: CaO 50.5%, $P_2O_5$ 31.9%, $Fe_2O_3$ 0.15%, $Al_2O_3$ 0.4%, F 2.1%, $SO_3$ 2.9%, $SiO_2$ 1.7%, $CO_2$ 3.5%, moisture 0.8%, at a quantity of 2460 g is mixed with 900 g of silica containing material, fineness according to Blaine 113 cm$^3$/gram, and 500 g of a silica containing component, Blaine fineness 880 cm$^2$/gram, calcium hydroxide, obtained by treating commercial lime with water, being added as the calcium oxide containing component. After hydrothermal treatment in the autoclave, this product also has great mechanical strength.

EXAMPLE III

A partially ground phosphate rock is mixed with a binder of silica containing material and calcium oxide containing material as per Example II. 20% finely powdered coke is added to the mixture. Likewise in this case, the granulated materials possess very high mechanical strengths after hardening in the autoclave with steam.

EXAMPLE IV

An iron-containing residue of the pyrite roasting is mixed with a mixture of silica and calcium oxide containing materials. The mixture is granulated while adding water, and autoclaved with steam (pressure 8 atm.). The strength after hardening is rather low.

Better results are obtained by mixing the binder which consists of the mixture of calcium hydroxide, obtained by slaking commercial lime, and silica containing material having a fineness according to Blaine of 838 cm$^2$/gram, with the pyrite ashes, adding water after mixing and granulating. After sufficiently large grains have been formed, the grains are covered with a mixture of calcium hydroxide and silica containing materials (e.g. ground sand) which during the continued granulating movement are deposited like an eggshell around the grains. After a sufficient quantity of binding agent is put around the grains, the granulated material is hardened by means of a hydrothermal treatment. After hardening the agglomerates have sufficient strength.

EXAMPLE V

A phosphate rock already containing sand is mixed with water and granulated. A binder of ground sand and calcium hydroxide is put around the grains like an eggshell, and the grains are hydrothermally cured in an autoclave. The agglomerates have a high strength.

EXAMPLE VI

A phosphate rock is mixed with sand and a finely powdered carbon containing material, granulation takes place while adding liquid, whereupon a binding agent of ground sand and calcium hydroxide is put around the grains. After hardening under hydrothermal conditions, particles having a high strength are obtained.

EXAMPLE VII

Silica containing and carbon containing materials are mixed with a calcium hydroxide containing material, for instance at the ratio:
297 g of finely powdered carbon containing material
300 g of silica containing material fineness according to Blaine 120 cm$^2$/gram (ground sand).
700 g of silica containing material, fineness according to Blaine 838 cm$^2$/gram (ground sand)
150 g of calcium hydroxide containing material.

After hardening with steam in the autoclave, the particle agglomerates have a great strength.

EXAMPLE VIII

A silica containing material is mixed with a calcium oxide containing material. This mixture is granulated while adding liquid. The grains as obtained after the hydrothermal treatment possess the strength of gravel, so that the grains can be used as filler in concrete. It is also possible to provide these particles with a shell.

EXAMPLE IX

Phosphate rock is mixed with a binder (containing silica and calcium hydroxide), and is granulated while adding liquid. Subsequently, an "egg shell" of a binder of ground sand and calcium hydroxide is provided around the grains. The grains have a great strength after hydrothermal hardening.

EXAMPLE X

A finely powdered material, for instance metallic ore, is granulated with liquid being present, whereupon a material capable of being hardened (ground sand and calcium hydroxide) is brought around the grains and hardened in an autoclave. The grains have a high mechanical strength and are very well suitable as raw material for a metal recovery furnace.

The layer around the grains may also consist of either sand or calcium hydroxide only if the metallic ore already contains sand or calcium oxide.

What is claimed is:

1. A method for producing hydrothermally hardened products by granulating a water hardenable mixture of calcareous and silicious materials and water and heating said granulated material under steam pressure in an autoclave, the improvement comprising the following steps:

(1) In a first stage, heating to a steam pressure in the autoclave of at most 0.9 atmospheres, being 1.9 atmospheres absolute pressure;

(2) subsequently decreasing the steam pressure in the autoclave so that the product in the first stage is subjected in a second stage at a steam pressure in the autoclave being less than 1.9 atmospheres absolute pressure, but more than 1.1 atmospheres absolute pressure; and (3) subsequently increasing the steam pressure in the autoclave so that the products from the second stage are subjected in a third stage at a steam pressure in the autoclave of at least 2 atmospheres absolute pressure wherein the first, second and third stages follow subsequently and after each other without absence of any steam pressure.

2. The method of claim 1, wherein in the first stage the pressure is raised up to 0.8 to 0.9 atm.

3. The method of claim 1, wherein the pressure in the autoclave is caused to drop by terminating the steam supply.

4. The method of claim 1 wherein the filler is a chemically reactive compound selected from the group consisting of phosphate rock, an iron containing residue of pyrite roasting and a carbon containing material.

5. The method of claim 1, wherein sand-containing phosphate rock is granulated with water, the grains are covered with a calcium oxide containing and/or a silica containing product, and the grains so covered are hardened.

6. The method of claim 1, wherein in the second stage the pressure in the autoclave is caused to drop down to a pressure between 0.1 and 0.5 atm.

7. A method as defined in claim 6, wherein in the second stage the pressure is caused to decrease to approximately 0.2 atm.

8. The method of claim 1, wherein a silica containing product having a Blaine fineness of 800 to 4500 is used.

9. A method as defined in claim 8, wherein silica containing products having two finenesses, that is, one fineness of 800 to 900, and one fineness of 350 to 450 Blaine, are used.

10. A method of producing hydrothermally hardened products comprising granulating a reaction mixture of materials comprising calcium hydroxide and silica in the presence of at least one filler selected from the group consisting of phosphate rock, an iron containing residue of pyrite roasting and a carbon containing material, in a rotating mixer, wherein at least one filler is mixed with a binding agent, the mixture for said products is formed, wherein these products are covered with silica containing particles ot calcium hydroxide containing particles, whilst subsequently such products are hardened under steam, in the following steps:

(1) In a first stage employing steam pressure in the autoclave of at most 0.9 atmospheres, being 1.9 atmospheres absolute pressure;

(2) subjecting the products of the first stage to a second stage by applying a steam pressure in the autoclave decreased from that present in the first stage; and (3) subsequently treating the products from the second stage in a third stage by applying a steam pressure in the autoclave higher than the pressure in the first stage wherein the first, second and third stages follow subsequently and after each other without absence of any steam pressure.

11. A method as defined in claim 10, wherein the filler is mixed only with water as the binding agent.

* * * * *

UNITED STATES PATENT OFFICE
CERTIFICATE OF CORRECTION

Patent No. 4,419,312          Dated   December 6, 1983

Inventor(s) HENDRIK LOGGERS and GIJSBERT VERSTEEG

It is certified that error appears in the above-identified patent and that said Letters Patent are hereby corrected as shown below:

In column 12, line 19, change "ot" to ---of---;

Signed and Sealed this

Fifth Day of June 1984

[SEAL]

Attest:

GERALD J. MOSSINGHOFF

Attesting Officer          Commissioner of Patents and Trademarks